UNITED STATES PATENT OFFICE.

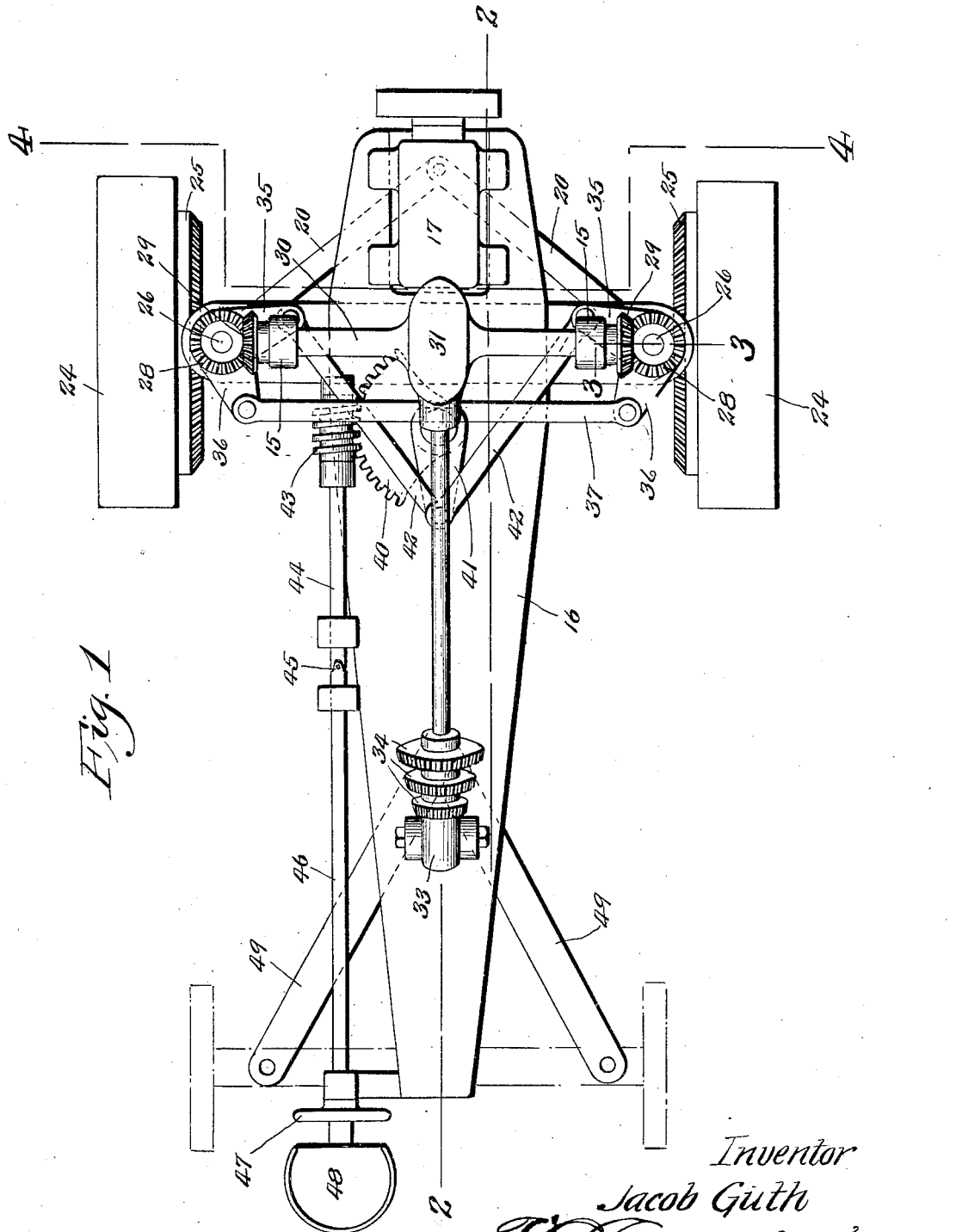

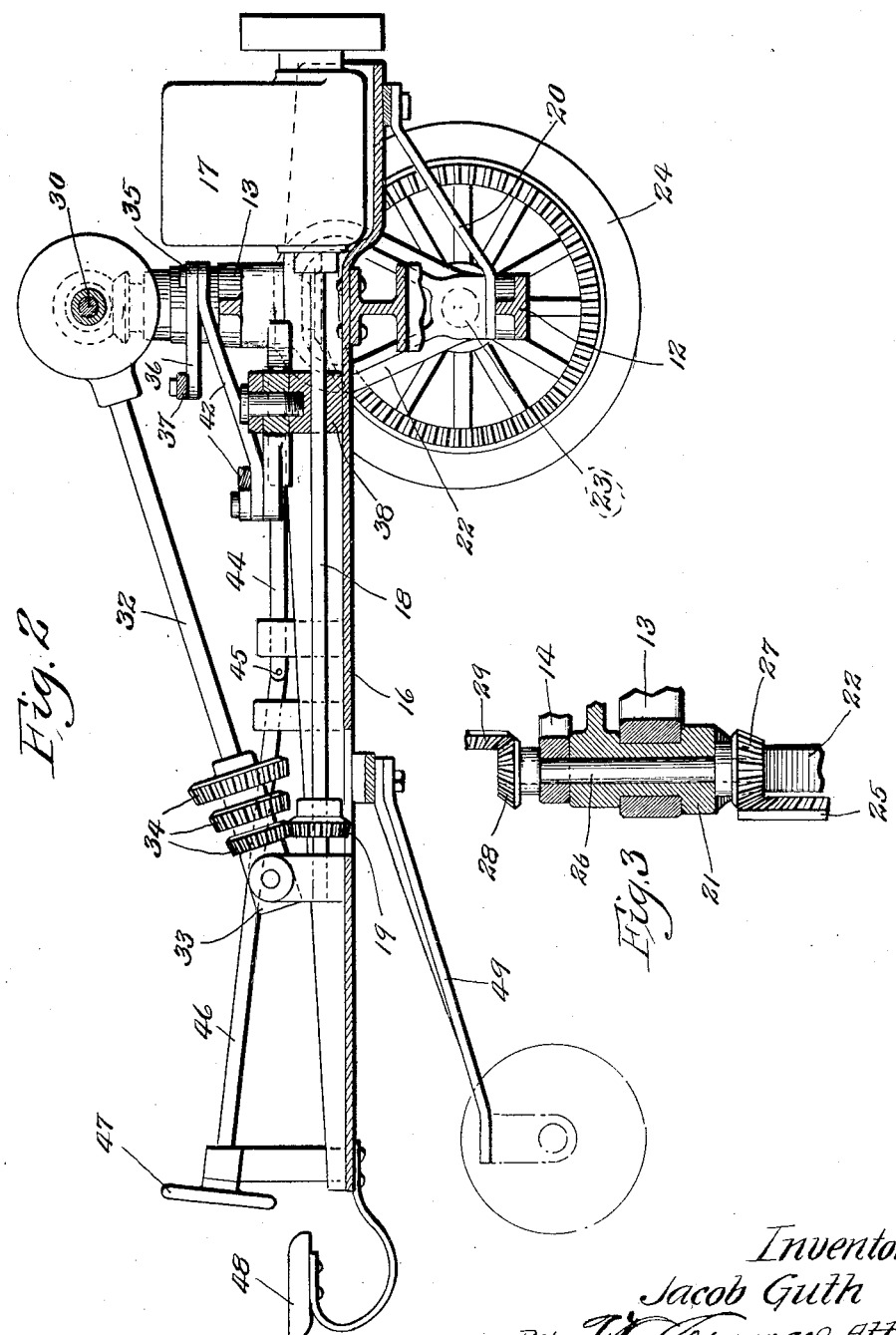

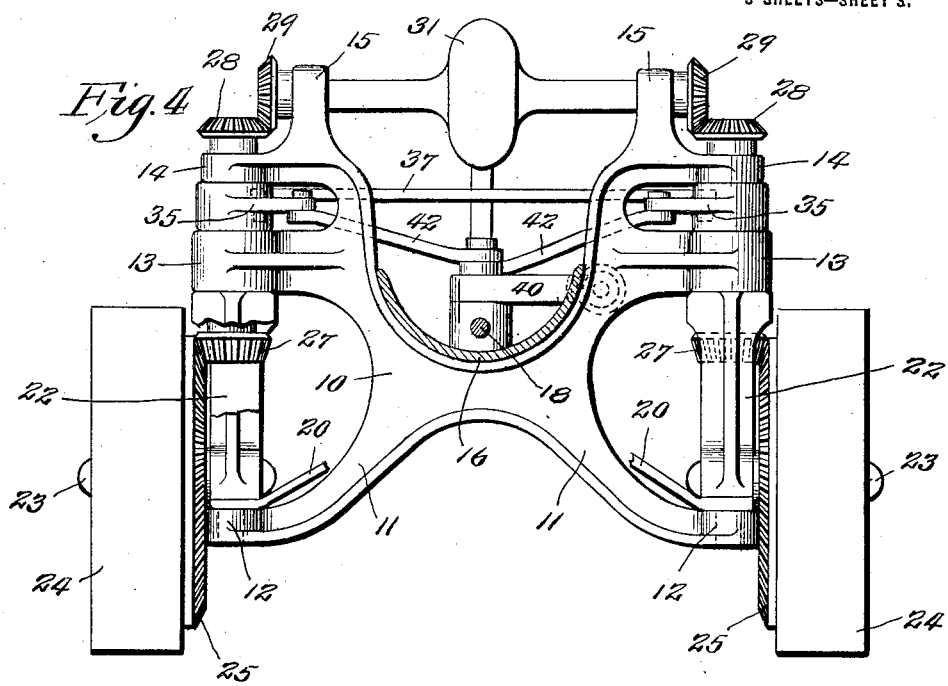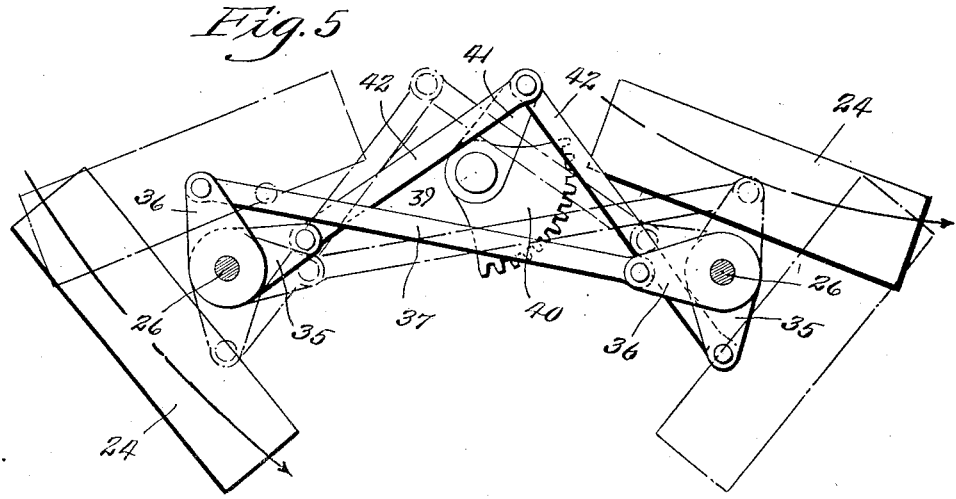

JACOB GUTH, OF SALEM, ILLINOIS.

TRACTOR.

1,350,451.  Specification of Letters Patent.  Patented Aug. 24, 1920.

Application filed November 26, 1918. Serial No. 264,276.

*To all whom it may concern:*

Be it known that I, JACOB GUTH, a citizen of the United States, residing at Salem, Illinois, have invented a certain new and useful Improvement in Tractors, of which the following is a full, clear, and exact description, such as will enable others skilled in the art to which it appertains to make and use the same, reference being had to the accompanying drawings, forming part of this specification.

My invention relates generally to tractors and more particularly to a steering gear therefor, the principal object of my invention being to provide a relatively simple, durable and efficient steering mechanism which may be readily manipulated by the operator and which is arranged and constructed so as to enable the entire machine to be turned within a relatively small radius.

A further object of my invention is to provide an improved form of tractor frame which is composed of comparatively few parts and in which is combined strength and rigidity with lightness of weight, and the parts of said frame being constructed and combined so as to withstand to the greatest advantage, strains and stresses which are developed while the tractor is in service.

In my improved tractor, the front wheels in addition to serving as traction or driving wheels, perform the functions of steering wheels inasmuch as they are mounted in frames that are arranged to turn on vertical axes through the medium of manually operated steering mechanism. By virtue of this construction, the rear wheels can be dispensed with and the rear portion of the truck directly connected to a wagon or to a farming implement such as a plow, cultivator, harrow, seeder, or the like. The operator's seat and the steering wheel are preferably arranged at the rear end of the tractor, and consequently when said tractor is used for operating an agricultural implement, the operator occupies a position immediately over said implement or in a position where he can readily watch the operation thereof, make the necessary adjustments thereupon, and drive and steer the tractor so as to obtain best results from the implement connected thereto.

With the foregoing and other objects in view, my invention consists in certain novel features of construction and arrangement of parts, hereinafter more fully described and claimed, and illustrated in the accompanying drawings, in which—

Figure 1 is a plan view of a tractor constructed in accordance with my invention.

Fig. 2 is a vertical section taken approximately on the line 2—2 of Fig. 1.

Fig. 3 is a vertical section taken approximately on the line 3—3 of Fig. 1.

Fig. 4 is a cross section taken approximately on the line 4—4 of Fig. 1.

Fig. 5 is a diagrammatic plan view of the front wheels of the tractor and the steering mechanism associated therewith.

Referring by numerals to the accompanying drawings which illustrate a practical embodiment of my invention, 10 designates the front member of the tractor frame, said member being preferably cast in a single piece and the upper portion substantially U-shape when viewed in front or rear elevation. Formed integral with the lower portion of this frame are downwardly and laterally projecting arms 11, the ends of which terminate in vertically disposed bearings 12. Formed integral with the upper portion of each side of the frame 10 is a pair of outwardly projecting bearings 13 and 14, the same being spaced a slight distance apart and disposed in alinement with each other and with the corresponding bearing 12. Formed integral with the upper portion of each side of the frame 10 and immediately adjacent to each bearing 14 is a horizontally disposed bearing 15.

The main body portion of the tractor frame is formed of a relatively narrow elongated plate or section of sheet metal 16, the same being preferably curved in cross section so as to form a shallow trough and the front portion of this plate 16 is arranged within the U-shaped portion of frame 10 and rigidly fixed thereto in any suitable manner. The forward end portion of plate 16 projects a short distance beyond frame 10 and serves as a support for the engine or motor 17 that furnishes motive power for the tractor.

The engine shaft 18 extends rearwardly over the central portion of plate 10 and mounted for sliding movement on the rear portion of this shaft is a transmission pinion 19, the same being operated by suitable means well-known in the art. Secured in any suitable manner to the lower portions of arms 11 adjacent to the bearings 12 are the lower ends of inclined braces 20, the upper ends thereof being fixed in any suitable manner to the forward portion of plate 16, these braces being for the purpose of reinforcing the front portion of the frame and forming a strong substantial connection between the frame members 11 and 16.

Journaled for rotation in each bearing 13 is a short vertically disposed tubular shaft 21, and formed integral with the lower end thereof is a vertically disposed loop or open frame 22, the lower end thereof being provided with a journal which occupies the corresponding bearing 12. Seated in the lower portion of the loop or open frame is the inner end of an outwardly projecting stub shaft 23 and journaled thereupon is a traction wheel 24 of any desired construction. Fixed to the inner face of each traction wheel is a beveled gear wheel 25.

Loosely mounted in each tubular shaft 21 and the adjustable bearing 14 is a vertically disposed shaft 26, the same carrying on its lower end a beveled pinion 27, which meshes with the corresponding beveled gear wheel 25.

Fixed on the upper ends of the shafts 26 are beveled pinions 28 and meshing therewith are beveled pinions 29, the latter being carried by the ends of a differential shaft 30. The two parts of this shaft are connected by differential gearing of a type well known in the art, and said gearing being contained within a housing 31. The shaft 32 for driving this differential shaft occupies an inclined position above the central portion of plate 16, its lower end being mounted in a suitable bearing 33 and carried by said shaft is a series of pinions 34 of different sizes and with which pinion 19 is adapted to be selectively engaged. Thus it will be seen that as motor 17 is operated, the power and rotary motion of its shaft 18 will be transmitted through pinion 19 and one of the pinions 34 to shaft 32, from thence through differential gearing to the parts of shaft 30, and from thence through pinions 29 and 28 to the vertical shafts 26, and from thence through pinions 27 to the beveled gear wheels 25 carried by the traction wheels.

Formed integral with or fixed to each tubular shaft 21 and at a point between the bearings 13 and 14 is a pair of relatively short crank arms 35 and 36. Under normal conditions, or while the traction wheels are parallel with the longitudinal axis of the frame of the machine, the crank arms 35 project inwardly and with their inner ends slightly in advance of a line drawn through the axes of the shafts 26.

The crank arms 36 are disposed at angles of approximately forty-five degrees relative to the arms 35 and under normal conditions, these arms 36 project rearwardly and at slight angles inwardly toward each other. The ends of the crank arms 36 are connected by a rod 37.

Fixed on top of plate 16 and slightly to the rear of frame 10 is a block 38 which serves as a bearing for shaft 18 and journaled on a pin or bolt 39 which is seated in the upper portion of this block is a toothed segment 40. Formed integral with or fixed to this segment is a short rearwardly projecting arm 41 and pivotally connected to the rear end thereof are the rear ends of a pair of connecting rods 42. The forward end of each rod 42 is pivotally connected to the inner end of the corresponding one of crank arms 35.

Meshing with the teeth of segment 40 is a worm 43, the same being carried by a longitudinally disposed shaft 44 that is arranged for rotation in suitable bearings on plate 16. The rear end of this shaft 44 is connected by a universal joint 45 to the forward end of a steering shaft 46, the rear end thereof carrying a steering wheel 47. This steering wheel is positioned immediately in front of an operator's seat 48, which latter is carried by a suitable support at the rear end of frame member 16.

Secured in any suitable manner to the rear portion of frame member 16 is a pair of rearwardly and outwardly projecting bars 49, which serve as attaching members for a truck or agricultural implement, such as a plow cultivator, harrow, drill, or the like, and which implement is drawn forwardly by the tractor.

If the tractor is utilized for pulling loaded wagons or the like, the tongue or front portion of the running gear of the wagon can be directly connected to the bars 49 or the rear portion of frame member 16, or in the event that the tractor is being driven from one point of use to another, a simple form of truck such as is shown by dotted lines in Figs. 1 and 2, may be attached to the bars 49 or frame member 16.

To steer the truck during its forward movement or to turn the truck partially or completely around, the operator positioned on seat 48 rotates shafts 46 and 44 by manual manipulation of the steering wheel 47 and this rotary motion is transmitted from worm 43 to segment 40. As the segment is thus operated, crank arm 41 will be swung laterally and the motion thereof transmitted through connecting rods 42 to crank arms 35 and from thence to tubular shafts 21. These shafts will thus be simultaneously rotated in the same direction with the result that the loops or open frames carrying the traction wheels 24 on their lower ends will be correspondingly turned.

Obviously as this turning movement is imparted to tubular shafts 21, crank arms 36 will be correspondingly moved, and connecting rod 37 will act as an equalizer to coöperate with rods 42 in the application of the turning movement.

The angular positions of the arms 35 and 36 and connecting rods 42 and 37 with respect to each other are such that when in turning toward the righthand, the righthand one of the wheels 24 will turn at slightly greater speed than the lefthand one of the wheels, and as a result, it will gradually assume a position of greater angularity with respect to the center line or axis of the body of the tractor than the lefthand one of the wheels, and obviously, this action is reversed when the wheels are swung toward the lefthand, that is, the lefthand one of the wheels will move more rapidly and assume a position of greater angularity relative to the axis of the body of the tractor than the righthand wheel. This increased movement or angularity of one wheel with respect to the other increases proportionately with the turning movement imparted to the wheels by the manually operated steering gear, and as the forward one of the two wheels has a position of greater angularity than the other while turning, said wheels will operate to the greatest advantage in making a relatively short or sharp turn.

The positions of the wheels when shifted to their extreme limit of movement in both directions is illustrated by the solid and dotted lines in Fig. 5, and the curved lines upon the wheels shown in solid lines in said figure indicate the direction of forward movement of the wheels.

A tractor of my improved construction is comparatively simple, can be completely turned around within a comparatively small radius, and is particularly applicable for use in drawing loaded wagons or the like or for being directly connected to various farm implements which in service are drawn over the ground.

It will be readily understood that minor changes in the size, form and construction of the various parts of my improved tractor can be made and substituted for those herein shown and described, without departing from the spirit of my invention, the scope of which is set forth in the appended claims.

I claim:

1. In a tractor having a main frame, the combination with a transversely disposed frame arranged near the forward end of said main frame, of vertically disposed members mounted for rotation in the ends of said transverse frame, wheels carried by said vertically disposed members, a pair of crank arms carried by each vertically disposed member, the members of each pair of crank arms being disposed substantially at right angles to each other, one arm of each pair normally projecting inwardly toward the center of the main frame and the other arm of each pair projecting rearwardly, a pivotally mounted crank arm on the main frame, connecting rods between said pivotally mounted crank arm and the inwardly projecting crank arms on the vertically disposed members, and a rod connecting the rearwardly projecting crank arms on said vertically disposed members.

2. In a tractor having a main frame, the combination with a transversely disposed frame arranged near the forward end of said main frame, of vertically disposed members mounted for rotation in the ends of said transverse frame, wheels carried by said vertically disposed members, a pair of crank arms carried by each vertically disposed member, the members of each pair of crank arms being disposed substantially at right angles to each other, one arm of each pair normally projecting inwardly toward the center of the main frame and the other arm of each pair projecting rearwardly, a pivotally mounted crank arm on the main frame, connecting rods between said pivotally mounted crank arm and the inwardly projecting crank arms on the vertically disposed members, a rod connecting the rearwardly projecting crank arms on vertically disposed members, the angularity of said crank arms and connecting rods being such as to impart greater movement to one of the vertically disposed wheel carrying members than to the other, when said members are shifted to effect a turning movement of the tractor, and means including a worm and toothed segment for imparting movement to the pivotally mounted crank arm.

3. In a tractor the combination with a transversely disposed frame at the forward portion of said tractor and having vertically alined bearings in its end portions of members mounted for rotation in said bearings, stub shafts carried by and projecting outwardly from said members, wheels journaled on said stub shafts, a crank arm mounted on the tractor frame and normally occupying a position substantially parallel with the wheels, a pair of crank arms carried by the rotatably mounted members, which crank arms normally occupy positions substantially parallel with the wheels and with the crank arm on the tractor frame, a rod connecting the members of said pair of crank arms, a second pair of crank arms on the rotatably mounted members, which second pair of crank arms normally occupy angular positions with respect to the first mentioned pair of crank arms and the crank arm on the tractor frame, and rods connecting the crank arm on the tractor frame with the members of the second mentioned pair of crank arms, which last mentioned rods occupy angular positions with respect to each other and with respect to the first mentioned connecting rod.

4. In a tractor having a main frame and a transversely disposed frame arranged near the forward end of said main frame, the combination with vertically disposed members mounted for rotation in the ends of said transverse frame, of wheels carried by said vertically disposed members, a crank arm fulcrumed on the tractor frame, crank arms projecting forwardly and inwardly from the vertically disposed members at the ends of the transverse frame, rods connecting said forwardly projecting crank arms with the crank arm on the tractor frame, which rods normally occupy angular positions with respect to each other and with respect to the crank arms to which they are connected, crank arms projecting rearwardly from the vertically disposed members in the ends of the transverse frame, which last mentioned crank arms occupy positions substantially parallel with the crank arm on the frame, and an equalizing rod connecting said rearwardly projecting pair of crank arms, which equalizing rod normally occupies a position parallel with the transversely disposed frame at the forward end of the main frame.

In testimony whereof I hereunto affix my signature this 23rd day of November, 1918.

JACOB GUTH.